United States Patent
Yerrabommanahalli et al.

(10) Patent No.: US 8,838,097 B2
(45) Date of Patent: Sep. 16, 2014

(54) SYSTEM FOR BETTER SERVICE RESELECTION WHEN ON OTHER THAN THE MOST PREFERRED SYSTEM

(75) Inventors: Vikram B. Yerrabommanahalli, Sunnyvale, CA (US); Saad Zaidi, San Diego, CA (US); Daniel Henry Salek, Sydney (AU); Francis Ming-Meng Ngai, Louisville, CO (US)

(73) Assignee: Qualcomm Incorporated, San Diego, CA (US)

( * ) Notice: Subject to any disclaimer, the term of this patent is extended or adjusted under 35 U.S.C. 154(b) by 808 days.

(21) Appl. No.: 13/037,809

(22) Filed: Mar. 1, 2011

(65) Prior Publication Data
US 2012/0225649 A1 Sep. 6, 2012

(51) Int. Cl.
*H04W 4/00* (2009.01)
*H04W 48/18* (2009.01)
*H04W 48/16* (2009.01)
*H04W 76/04* (2009.01)

(52) U.S. Cl.
CPC .............. *H04W 48/18* (2013.01); *H04W 48/16* (2013.01); *H04W 76/048* (2013.01)
USPC ........................................ 455/434; 455/426.1

(58) Field of Classification Search
CPC .... H04W 48/16; H04W 48/18; H04W 76/048
USPC .............................................. 455/426.1, 434
See application file for complete search history.

(56) References Cited

U.S. PATENT DOCUMENTS

| | | | |
|---|---|---|---|
| 7,277,704 B2 | 10/2007 | Cooper | |
| 7,593,727 B2 | 9/2009 | Zhao et al. | |
| 7,733,871 B2 | 6/2010 | Choi et al. | |
| 2005/0059395 A1 | 3/2005 | Park | |
| 2008/0057948 A1* | 3/2008 | Mittal et al. | 455/426.1 |
| 2010/0093349 A1 | 4/2010 | Gandhi et al. | |

OTHER PUBLICATIONS

International Search Report and Written Opinion—PCT/US2012/027349—ISA/EPO—Jan. 3, 2013.

* cited by examiner

*Primary Examiner* — Opiribo Georgewill
(74) *Attorney, Agent, or Firm* — Abdollah Katbab

(57) ABSTRACT

System for better service reselection when on other than the Most Preferred system. In various aspects, methods and corresponding apparatus are provided for a service reselection system that operates on a device to provide better service reselection during idle mode, origination mode and active traffic mode. A method includes detecting entry into slotted mode operation on a Less Preferred system, waiting for page monitoring to complete at selected slot cycle wakeup times, performing a service reselection scan at the selected slot cycle wakeup times to find More Preferred systems, wherein the service reselection scan is performed after the page monitoring has completed, and limiting a time duration of the service reselection scan so as to avoid interference with the page monitoring to be performed at slot cycle wakeup times that follow the selected slot cycle wakeup times.

13 Claims, 10 Drawing Sheets

SYSTEM FOR BETTER SERVICE RESELECTION WHEN ON OTHER THAN THE MOST PREFERRED SYSTEM

BACKGROUND

1. Field

The present application relates generally to the operation and design of wireless communication systems, and more particularly, to a system for better service reselection when on other than the most preferred system.

2. Relevant Background

When a Mobile Station (MS) has acquired a system that is other than the Most Preferred in a particular region, the MS searches for More Preferred systems in a process known as Better Service Reselection (BSR). For example, the MS has a Preferred Roaming List (PRL) that identifies and prioritizes the various networks that the MS may encounter. The MS can search this list to determine if it is operating on the Most Preferred system since traffic (e.g. voice, packet data, SMS) sent or received on a system identified as Less Preferred (i.e. not the Most Preferred) often represents a higher cost to the Home operator for the MS, and possibly to the end-user. In addition, the quality experienced by the user may be lower on a Less Preferred system.

The current algorithm for BSR uses a configurable period timer, and a search bound timer. Whenever the period timer expires, the MS performs BSR until either: better service is found; the list of channels to search is exhausted; or the search bound timer expires.

Unfortunately, the current algorithm exhibits several problems. For example, between expirations of the period timer, the MS is not searching for better service. If the MS is on a Less Preferred system and has moved back into the coverage area of the Most Preferred system, it will not acquire this system until the next expiration of the timer. Another problem with the current algorithm is power consumption. Searching for service is battery-intensive and the current algorithm requires the MS to "wake-up" based on the period timer to initiate a search, during what may otherwise have been a battery-saving "sleep" period. This results in an increase in power consumption for the device. Still another problem with the current algorithm is that while the MS is searching for better service, the MS may not be monitoring the paging channel on the currently acquired (Less Preferred) system. Thus, paging messages directed at the MS (e.g. for voice calls or SMS messages) sent by the Less Preferred network during this search time may not be received at the MS.

Therefore, it would be desirable to have a system for better service reselection that overcomes the problems associated with conventional systems described above.

SUMMARY

In various aspects, a BSR system is provided that operates on a mobile device to provide BSR when on other than the Most Preferred system. For example, the BSR system operates to assure fast acquisition of More Preferred systems with the goal of acquiring and operating on the Most Preferred system. Operating on a More Preferred system is preferable to operating on a currently acquired Less Preferred System. However, a More Preferred system may itself be Less Preferred when compared to other systems even higher up the Priority ranking. Thus, the BSR system searches for all More Preferred systems and continues to search until the Most Preferred system is found.

In various aspects, the BSR system operates during idle mode to save power and assure fast acquisition of More Preferred systems. The BSR system operates during origination mode to acquire More Preferred systems prior to call origination to save costs and obtain the best available Quality of Service (QoS). The BSR system also operates during an active traffic mode to acquire More Preferred systems even during ongoing calls. Furthermore, BSR searching provided by the BSR system is guaranteed not to interfere with the device's reception of overhead updates (i.e., page messages). Thus, the BSR system operates to allow a device to acquire More Preferred systems quickly, obtain high quality services, save power, and receive all overhead updates.

In various aspects, methods and corresponding apparatus are provided for BSR in a communication network. A method comprises detecting entry into slotted mode operation on a Less Preferred system, waiting for page monitoring to complete at selected slot cycle wakeup times, performing a service reselection scan at the selected slot cycle wakeup times to find More Preferred systems, wherein the service reselection scan is performed after the page monitoring has completed, and limiting a time duration of the service reselection scan so as to avoid interference with the page monitoring to be performed at slot cycle wakeup times that follow the selected slot cycle wakeup times.

In various aspects, methods and corresponding apparatus are provided for BSR in a communication network. A method comprises detecting operation on a Less Preferred system, determining whether an originating message to be transmitted is a call origination or a page response, and performing a service reselection scan prior to transmitting if the originating message is the call origination.

In various aspects, methods and corresponding apparatus are provided for BSR in a communication network. A method comprises detecting operation on a Less Preferred system, determining whether an active call is on a 1xRTT system or on an 1xEVDO system, determining whether to perform a first service reselection scan to find a More Preferred 1xRTT system if the active call is on the 1xRTT system, and determining whether to perform a second service reselection scan to find at least one of a More Preferred 1xRTT system and a More Preferred 1xEVDO system if the active call is on the 1xEVDO system.

BRIEF DESCRIPTION OF THE DRAWINGS

The foregoing aspects described herein will become more readily apparent by reference to the following Description when taken in conjunction with the accompanying drawings wherein.

DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

The disclosed system provides a novel BSR system for use by a mobile device to provide better service reselection when operating on other than the Most Preferred system.

Figure 1:
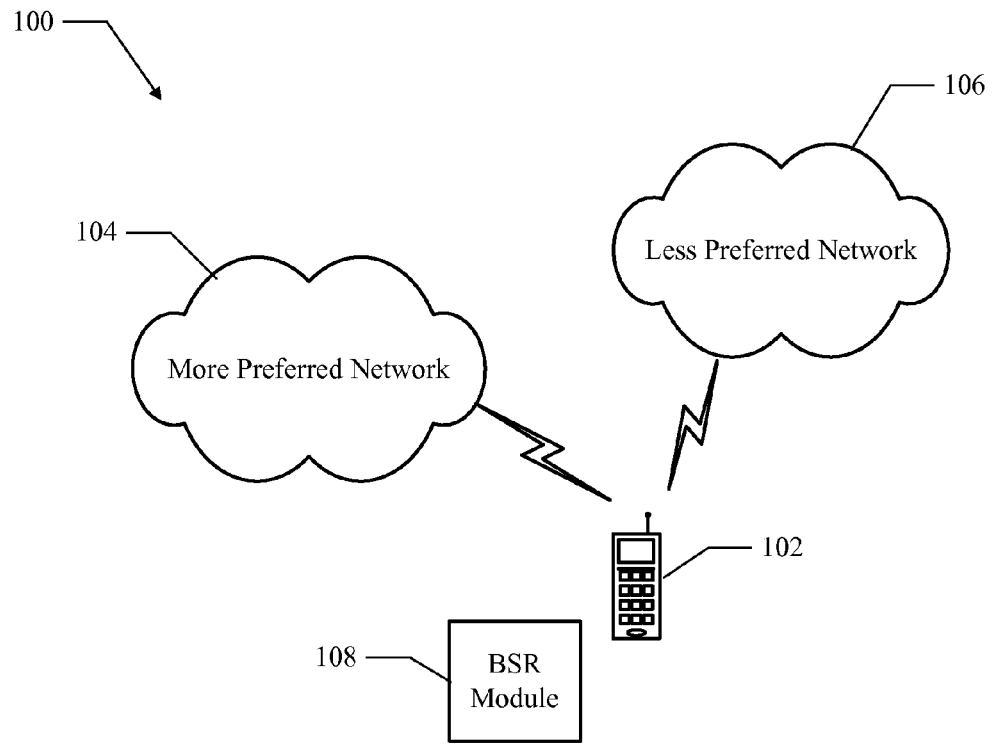
FIG. 1 shows an exemplary communication network that illustrates aspects of a novel BSR system.

FIG. 1 shows an exemplary communication network 100 that illustrates aspects of a novel BSR system. The communication network 100 comprises a mobile device 102 that is operable to communicate with a first network 104 and a second network 106. The mobile device 102 comprises a BSR module 108 that operates to provide service reselection in accordance with embodiments of the novel BSR system. During operation, the device 102 maintains a list of networks that may be accessed to receive network services. The list is prioritized from More Preferred networks to Less Preferred networks. During the various operational modes of the mobile device 102, the BSR module 108 operates to perform better service reselection to search the list to determine if More Preferred networks are available. If a More Preferred network is available, the BSR module 108 operates to acquire the More Preferred network.

It will be assumed that with respect to the mobile device 102, the prioritized list indicates that the first network 104 is More Preferred and the second network 106 is Less Preferred. For example, the network 104 may provide more services, better quality, and/or lower cost than the network 106. Assuming that the device 102 is operating on the Less Preferred network 106, the BSR module 108 operates during various operating modes of the device 102 to search for More Preferred networks. If the BSR module 108 discovers the More Preferred network 104 during one of its searches, it will arrange for the device 102 to begin operations on the More Preferred network 104. The search performed by the BSR module 108 occurs without the device 102 missing any overhead messages from the Less Preferred network 106.

The BSR module 108 comprises hardware and/or hardware executing software that operates to perform better service reselection during various operating modes of the mobile device 102. The following is an exemplary list of operating modes of the device 102 during which service reselection is performed by the BSR module 108.

1. Idle mode—The BSR module 108 operates to perform better service reselection during idle mode so that the device can acquire a More Preferred network during scheduled slot cycle wakeup times.
2. Origination mode—The BSR module 108 operates to perform better service reselection prior to call origination from the device so that the call origination can be performed on a More Preferred network.
3. Active traffic mode—The BSR module 108 operates to perform better service reselection during an active traffic state so that a More Preferred network can be utilized during data call.

The BSR module 108 operates to perform better service reselection during the above operational modes to provide the mobile device 102 with several advantages over conventional reselection algorithms. For example, the BSR module 108 operates so that the mobile device 102 is able to switch to More Preferred systems faster, save power, obtain high quality services, and reliably receive all paging messages. The following provides a detailed description of the operation of the BSR module 108.

Figure 2:
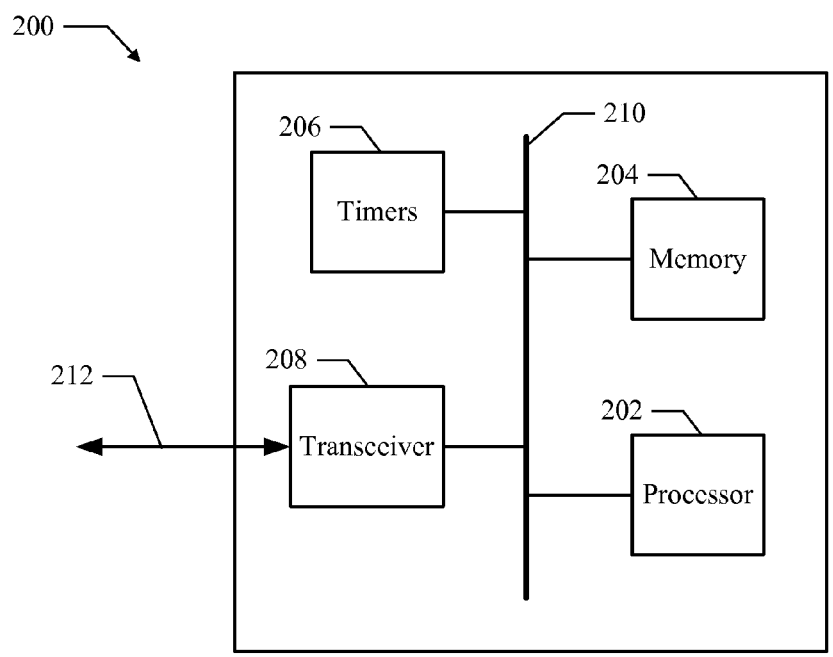
FIG. 2 shows an exemplary BSR module.

FIG. 2 shows an exemplary BSR module 200. The BSR module 200 can be used in any type of communication device to perform better service reselection. For example, the BSR module 200 is suitable for use as the BSR module 108 shown in FIG. 1. The BSR module 200 comprises processor 202, memory 204, timers 206, and transceiver 208 all coupled to communicate over data bus 210. It should be noted that the BSR module 200 is just one implementation and that other implementations are possible.

The transceiver 208 comprises hardware and/or hardware executing software that operates to allow the BSR module 200 to communicate data or other information over a communication link 212 with remote devices or systems. For example, the transceiver 208 is operable to receive or monitor communications from one or more networks to determine signal strength, data rates, quality indicators or other network parameters that can be used to assess the availability of a network to make a reselection determination. The transceiver 208 also operates to pass any network parameters to the processor 202 using the bus 210. The processor 202 controls the transceiver 208 to monitor networks or perform a network reselection to begin operations on any network indicated by the processor 202. The communication link 212 comprises a wireless or wired link having one or more communication channels, such as forward, reverse, paging, broadcast/multicast, control channels and/or any other type of communication channel.

The memory 204 comprises RAM, ROM, EEPROM or any other type of memory device that operates to allow information to be stored and retrieved at the BSR 200. The memory 204 is operable to store information such prioritized roaming lists, reselection criteria, timer values, service options (SO), operating modes or any other parameters to support the operation of the BSR module 200 to perform service reselection. Information stored in the memory 204 is accessible to the processor 202 or other elements of BSR module 200 through the bus 210.

The timers 206 comprise at least one of a CPU, processor, gate array, hardware logic, memory elements, and/or hardware executing software. The timers 206 comprise one or more timers that operate to time any selected time intervals during operation of the BSR module 200. For example, the timers 206 comprise wakeup timers, reselection frequency timers, reselection search duration timers, and any other timers utilized to perform service reselection. The timers 206 operate under the control of the processor 202 so that the timers 206 can be initialized, started, stopped, reset or otherwise controlled by the processor 202 using the bus 210. The timers 206 can also communicate over the bus 210 to indicate their status to the processor 202.

The processor 202 comprises at least one of a CPU, processor, gate array, hardware logic, memory elements, and/or hardware executing software. The processor 202 operates to control the operation of the BSR module 200 to perform service reselection. For example, the processor 202 controls the BSR module 200 to perform one or more of the following functions.

1. Determine the preference of a network with respect to a stored prioritized list of networks.
2. Determine mode of operation of the current device (i.e., idle mode, origination mode, active traffic mode).
3. Setup timers to perform a better service reselection algorithm.
4. Search for More Preferred networks during idle, origination and active traffic operating modes.
5. Determine the identity of detected networks.
6. Reselect to More Preferred networks that are discovered during better service reselection searching.

A more detailed description of the operation of the processor 202 and the BSR module 200 to provide service reselection is provided below.

Exemplary BSR Scanning Procedures

In various implementations, the BSR module 108 performs searches (or scans) to determine whether More Preferred networks are available. Two exemplary searching procedures are described herein. A successful search is defined to occur, for example, when BSR module 108 finds strong energy associated with a More Preferred system and is able to demodulate the overhead channels on the new More Preferred system.

A first exemplary scanning procedure that may be used by embodiments of the BSR module 200 is referred to herein as a mini BSR scan. In the mini BSR scan, the BSR module 200 searches the prioritized list in the memory 204 in one of several ways for a pre-determined time duration. The scan is complete when better service is found or the search duration time has expired.

A second exemplary scanning procedure that may be used by embodiments of the BSR module 200 is referred to herein as a full BSR scan. In the full BSR scan, a specific list of candidate networks is identified. The specific list may be shorter that the actual prioritized roaming list stored in the memory 204. The scan is performed by searching through the specific list of candidate networks for More Preferred networks. The scan is complete when better service is found, all candidate networks in the specific list have been searched, or a search bound timer expires.

For example, any of the following search techniques may be performed during a mini BSR scan.

1. Always search/repeat the $1^{st}$ channel on every mini BSR scan followed by the remaining channels in the order the channels appear in the stored prioritized roaming list. The number of channels searched will be determined by a search time duration variable (T_mini_bsr_search).
2. Repeat channels N1, N2 through Nn starting from top of the prioritized list every time for half of the search time duration (T_mini_bsr_search). For the remaining half of the search time duration, progressively search the remaining channels Nn+1, Nn+2 . . . Nn+n
3. Go progressively through the scan list but bounded by the search time duration (T_mini_bsr_search).
4. Start from the beginning of the scan list upon every mini BSR performed but bounded by the search time duration (T_mini_bsr_search).
5. Perform any conventional BSR scan.

In various aspects, mini BSR scanning provides a short duration scan for just a few channels from the prioritized list. Since the device is waking up at predetermined time intervals to monitor for page messages, the BSR module 200 performs mini BSR scanning after page monitoring is completed to allow selected channels to be scanned. In one implementation, channels at the top of the prioritized list are searched most often since they represent the Most Preferred systems. However, the device may be in area where a better system may be available but located farther down the prioritized list. Thus, mini BSR scanning also provides a mechanism to allow lower priority channels to be scanned as well.

In one implementation, the BSR module 200 performs the first technique above to repeat scanning the first channel in the prioritized list and then proceeds through the remaining channels in the prioritized list until the expiration of the search time duration. In another implementation, the BSR module 200 performs the second technique above to divide the available scanning time into two portions and then proceeds to scan higher priority channels in a first portion and lower priority channels in a second portion. Thus, even though there is a short amount of time available for mini BSR scanning, both techniques give extra weight to More Preferred channels but still operate to perform scanning of lower priority channels.

BSR During Idle Mode

In various aspects, the BSR system operates to provide better service reselection during idle mode. For example, the BSR module 108 of the device 102 operates to perform reselection when the device 102 is in idle mode so that the device 102 can obtain access to the Most Preferred or More Preferred networks even when idle.

In one implementation, when the device 102 is in idle mode on an other than Most preferred network, the BSR module 108 operates to search for More Preferred networks during wakeup intervals as a function of the slot cycle.

Figure 3:
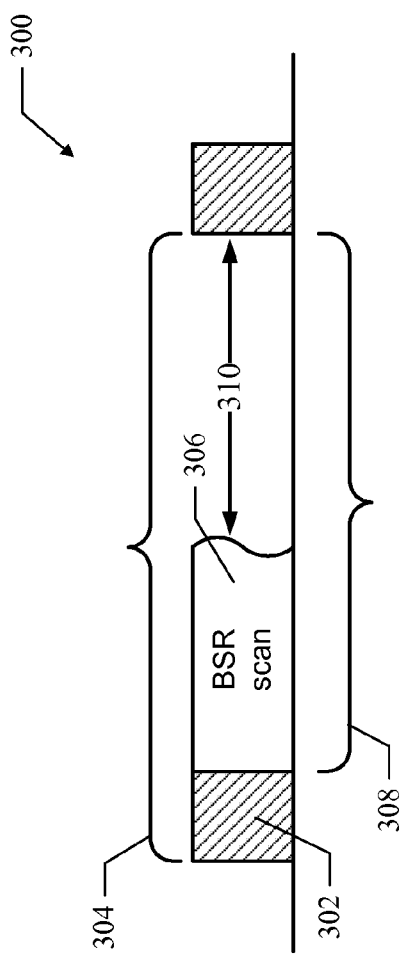
FIG. 3 shows an exemplary time line illustrating how idle mode service reselection is coupled with slot cycle processing.

FIG. 3 shows an exemplary timeline 300 illustrating BSR during idle mode. For example, in idle mode, the device 102 wakes up at predefined time intervals as a function of a slot cycle to monitor one or more paging channel slots. For example, the time interval 304 represents the time between assigned slot cycle wakeups. After waking up, the device monitors a Quick Paging channel (QPCH) or a Paging Channel (PCH) to check for page messages. Page monitoring occurs during a time interval indicated at 302.

In various implementations, the BSR module 200 operates to piggyback BSR procedures with the device's wakeup on a Less Preferred system to monitor the paging channel. Either mini BSR or full BSR scanning can be piggybacked with the device's wakeup to perform page channel monitoring. Thus, the BSR module 200 operates to perform mini BSR or full BSR scanning after the QPCH and/or PCH have been monitored and before returning to sleep on the Less Preferred System.

For example, after checking for pages, the BSR module 200 determines whether to perform a scan for a More Preferred system. If the BSR module 200 determines that a scan should be performed, the BSR module 200 begins the scan after page monitoring is completed, as illustrated at 306. The BSR algorithm performs the scan according to procedures described in another section of this document. In one implementation, the BSR algorithm determines the amount of time remaining 308 before the next slot wakeup time. The BSR algorithm then determines whether to complete the scan, postpone the scan or terminate the scan based on the time available before page monitoring is to occur during the next slot wakeup time. This ensures that the device will not miss any page monitoring opportunities due to BSR scanning so that pages can be reliably received by the device. After performing the BSR scan the device returns to sleep, as indicated at 310, until the next slot wakeup time.

It should also be noted that in addition allowing the device to reliably receiving page messages, the BSR system operates to save power since BSR scanning is tied to the device's normal paging cycle wakeups. For example, if the device tried to perform BSR searching during additional wakeups, separate from the normal paging cycle wakeups, more power would be consumed.

Telescopic BSR Scanning in Idle Mode

In one implementation, BSR scanning is performed in a "telescopic" fashion so that the time between performing BSR scans is increased or decreased depending on one or more factors or parameters. For example, the BSR algorithm adjusts the number of slot cycle wakeup times between performing BSR scans so that the frequency of scanning can be adapted to network conditions. Thus, if the device is roaming on a Less Preferred system and the chance of acquiring a More Preferred system is low, then the number of slot cycle wakeup times between performing BSR scans is increased so that searching is performed less frequently and power is conserved. Conversely, if there is a greater chance of acquiring a More Preferred system, then the number of slot cycle wakeup times between performing BSR scans is reduced so that searching is performed more frequently and therefore the More Preferred system can be acquired more quickly.

Figure 4:
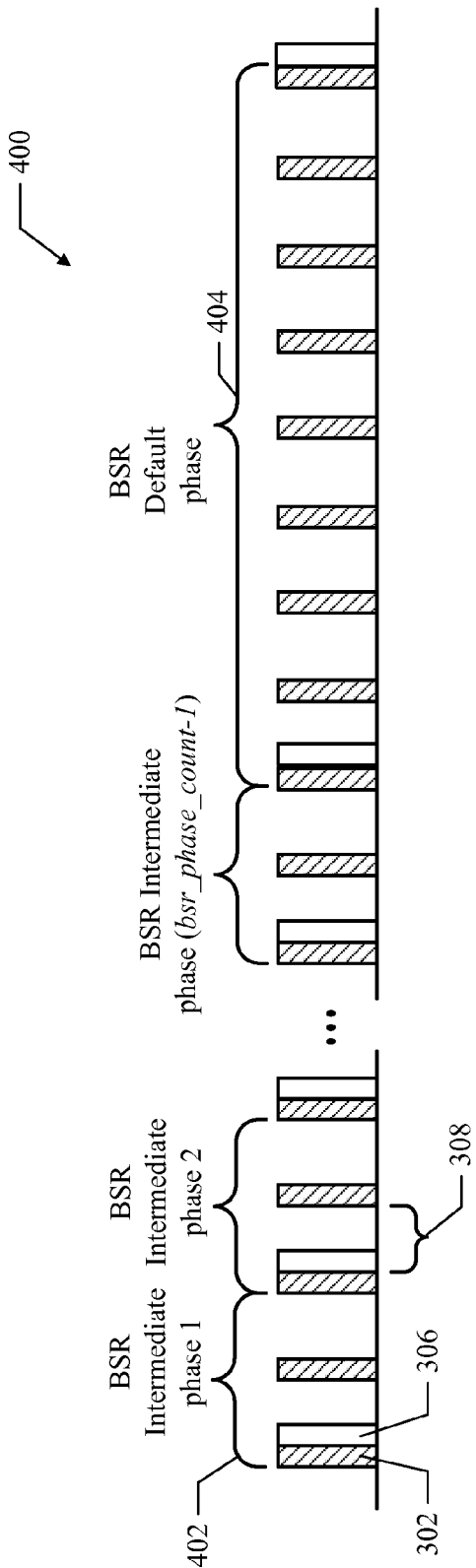
FIG. 4 shows an exemplary time line illustrating telescopic BSR scanning in idle mode

FIG. 4 shows an exemplary time line 400 illustrating telescopic BSR scanning in idle mode. In one implementation, the BSR module 200 performs mini BSR or full BSR scanning in multiple phases. During each phase, the BSR module 200 performs mini or full BSR scans at predefined wakeup intervals as a function of Slot Cycle, when not on the Most Preferred System. At the same time, the procedures also provide mechanisms to avoid/cancel mini BSR scans and interrupt full BSR scans in cases where the device needs to monitor the QPCH and/or the PCH on the Less Preferred System.

Referring to FIG. 4, the timeline 400 illustrates BSR scan phases to be performed by the BSR module 200 with the device in idle mode. For example, slot cycle page monitoring is indicated in shaded regions generally shown at 302. BSR scans are performed in un-shaded regions shown generally at 306. The performance of BSR scanning is configured to complete before the following slot cycle wakeup time so that the device does not miss any overhead messages. For example, the time indicator 308 illustrates the time available for BSR scanning prior to the start of the next slot cycle wakeup time. A number of intermediate phases for BSR scanning are shown followed by default phase BSR scanning. For example, there are bsr_phase_count−1 intermediate phases for BSR scanning followed by default phase for BSR scanning. The BSR system can separately and individually configure each of the intermediate phases and default phase BSR scanning to occur at any power of 2 multiple of the slot cycle. For example, in FIG. 4, intermediate phase BSR scanning is set to occur every two slot cycle wakeup times, as shown generally at 402. The default phase, BSR scanning is set to occur every eight slot cycle wakeup times, as shown generally at 404. Furthermore, during intermediate phase BSR scanning, the number of slot cycle wakeup times between BSR scanning can be configured differently for each intermediate phase providing the telescopic effect described above.

The detailed operation during each "BSR Intermediate Phase" scanning and "BSR Default Phase" scanning is discussed below. The use of these procedures may be enabled by a configurable parameter (bsr_phase_count) stored in the memory 204. When the use of these procedures are enabled, the BSR phases may be one at a minimum or extended to multiple phases with the maximum up to any desired value based on the specific implementation. The maximum number of phases used in the procedure may be restricted by the same configurable parameter (bsr_phase_count) stored in the memory 204.

A bsr_phase_count value of 0 implies the procedures being discussed are disabled and the device 102 shall follow any other implementations to perform BSR scanning.

A bsr_phase_count value of 1 implies the procedures being discussed are enabled and the device 102 shall perform "BSR Default Phase" procedures as discussed later.

A bsr_phase_count value of 2 or greater implies the procedures being discussed are enabled and the device 102 shall perform "BSR Intermediate Phase(s)" procedures as discussed later. The total number of phases is governed by the integer value of the bsr_phase_count parameter. Thus, the total number of phases includes some number of BSR Intermediate Phase(s) and a BSR Default Phase.

When the bsr_phase_count>0, BSR phase(s) are activated when the device enters "Slotted Mode Operation" on a "Less Preferred 1xRTT and/or 1xEVDO System(s)" after every:

I. acquisition of a Less Preferred 1xRTT and/or 1xEVDO System(s), or

II. successful transmission over Access Channel on a Less Preferred 1xRTT and/or 1xEVDO System(s), or III. upon a close of Traffic Channel on a Less Preferred 1xRTT and/or 1xEVDO System(s)

The BSR phase duration and BSR intervals within each phase are defined as a function of configurable parameters (listed below) stored in the memory 204.

The configurable parameters comprise the following.

1. bsr_phase_count defines if the BSR system is disabled (value=0) or enabled (value >0), and also the number of BSR phases being used in the procedure. For example, if (value >0) the integer value indicates the number of BSR phases including a BSR Default Phase.

2. bsr_slotcycle_default defines the periodicity at which the BSR module 200 performs a full BSR procedure when in the BSR default phase. The periodicity of the full BSR in the BSR Default Phase=$1.28*2^{(max(bsr\_slotcycle\_default, SLOT\_CYCLE\_INDEXs))}$ seconds. The SLOT_CYCLE_INDEXs is the Slot cycle index (SCI) that is equal to the smaller of SLOT_CYCLE_INDEXp (preferred Slot Cycle Index stored in the memory of the device) and the received maximum slot cycle index. Note that this is the same formula that determines the wakeup cycle in a CDMA2000 1x system, but the bsr_slotcycle_default value is not limited to the SCI values of 0 to 7.

3. bsr_phase_max_repeats defines the maximum number of times BSR Intermediate Phase(s) are repeated before completely falling back to the BSR Default Phase only. An internal bsr_slotcycle_repeats counter may be incremented every time the BSR Intermediate Phase 1 is completed up to bsr_slotcycle_repeats=bsr_slotcycle_max_repeats. This parameter limits the number of times the entire BSR process gets reset by a transmission, to prevent the device never reaching the most power-efficient default state. Thus the main BSR procedure is reset on successful transmission on an Access Channel and/or Traffic Channel, unless bsr_slotcycle_repeats=bsr_phase_max_repeats. The bsr_slotcycle_repeats counter is reset upon acquisition of the Most Preferred system. The value of 0 means the bsr_slotcycle_max_repeats is disabled and allows repetition of BSR Intermediate Phase(s) any number of times.

4. bsr_slotcycle_i governs the periodicity at which the BSR module 200 performs a mini BSR procedure. The periodicity of mini BSR in BSR Intermediate Phase $i=1.28*2^{\wedge}(\max(\text{bsr\_slotcycle\_i}, \text{SLOT\_CYCLE\_INDEXs}))$ seconds. The same formula is used to determine the wakeup cycle in CDMA2000 1x system, but the bsr_slotcycle_i value is not limited to the SCI values of 0 to 7. It is expected that bsr_slotcycle_i<bsr_slotcycle_i+1 and so on but the system is not limited to this implementation.

where SLOT_CYCLE_INDEXs is the Slot cycle index that is equal to the smaller of SLOT_CYCLE_INDEXp (preferred Slot Cycle Index stored in the memory of the device) and the received maximum slot cycle index, and i=1, when bsr_phase_count=2 and i=1 to bsr_phase_count−1, when bsr_phase_count>2. The total number of phases is governed by the integer value of bsr_phase_count.

5. bsr_max_counts_i defines the number of mini BSR procedures performed before a full BSR procedure is performed. An internal bsr_count_i counter may be incremented every time a mini BSR is completed up to bsr_count_i=bsr_max_counts_i before it is reset. The value of 0 means the BSR Intermediate Phase i is disabled or skipped and value of 1 means that no mini BSR procedures are performed but instead a full BSR is performed.

6. bsr_max_repeats_max_i defines the maximum number of times bsr_max_counts_i is reached before moving to the next "BSR Intermediate Phase" or the "BSR Default Phase".

Figure 5:
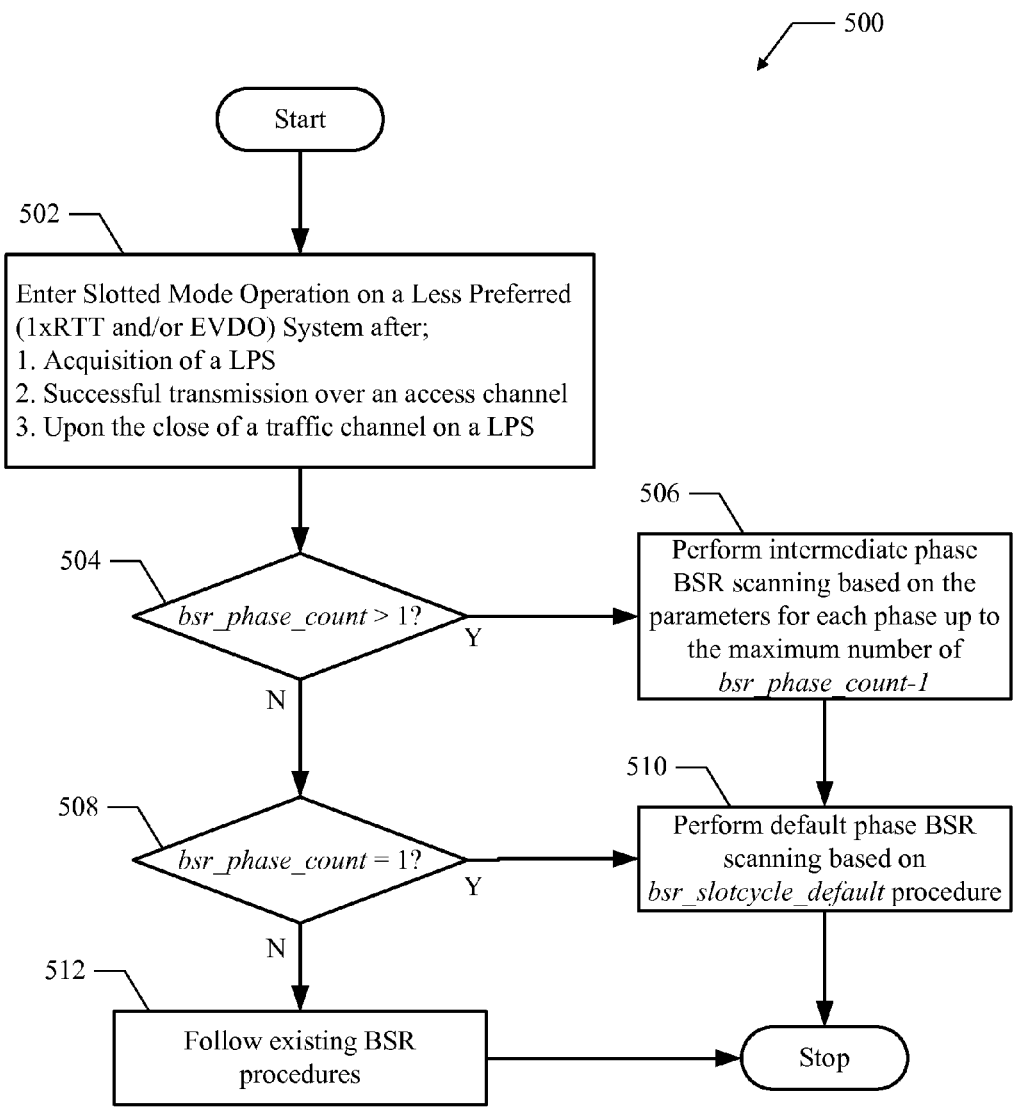
FIG. 5 shows an exemplary method for service reselection during idle mode.

FIG. 5 shows an exemplary method 500 for performing service reselection for a device in idle mode based on the parameter bsr_phase_count. For clarity, the method 500 is described below with reference to the BSR module 200. In one implementation, the processor 202 executes one or more sets of codes to control the BSR module 200 to perform the functions described below.

At block 502, it is determined that the device has entered slotted mode on a Less Preferred (1xRTT and/or 1xEVDO) system. For example, the method 500 may be performed when the device is operating on any of the following network scenarios.

1. 1xRTT mode only and the 1xRTT is on a Less Preferred System
2. 1xEVDO mode only and the 1xEVDO is on a Less Preferred System
3. 1xRTT and 1xEVDO mode and both are on a Less Preferred collocated System (Hybrid mode of operation)
4. 1xRTT mode on a Most Preferred System and 1xEVDO mode on a Less Preferred collocated System (Hybrid mode of operation)
5. 1xRTT mode on a Less Preferred System and 1xEVDO mode on a Most Preferred collocated system (Hybrid mode of operation)

At block 504, a determination is made as to whether the bsr_phase_count parameter is greater than one. For example, the processor 202 obtains this parameter from the memory 204 and determines if it is greater than one. A bsr_phase_count greater than one indicates that multiple BSR scans are to be performed in accordance with the novel BSR algorithm. If the bsr_phase_count parameter is greater than one, the method proceeds to block 506. If the bsr_phase_count parameter is not greater than one, the method proceeds to block 508.

At block 508, a determination is made as to whether the bsr_phase_count parameter is equal to one. For example, the processor 202 obtains this parameter from the memory 204 and determines if this parameter is equal to one. A bsr_phase_count equal to one indicates default BSR scans are to be performed. If the bsr_phase_count parameter is equal to one, the method proceeds to block 510. If the bsr_phase_count parameter is not equal to one, the method proceeds to block 512.

At block 506, BSR scanning for up to bsr_phase_count−1 intermediate phases are performed based on the stored parameters. For example, the processor 202 controls the transceiver 208 to perform intermediate phase BSR scans based on parameters stored in the memory 204. The scans are piggybacked with slot cycle wakeup times as illustrated in FIG. 3 and controlled so that they do not interfere with page monitoring on the Less Preferred system. Based on the stored parameters, the time (or number of slot cycles) between scans can be adjusted so that there are more or less slot cycles between scans to provide telescopic scanning if desired.

At block 510, default phase BSR scanning is performed based on bsr_slotcycle_default parameters. For example, the processor 202 controls the transceiver 208 to perform default phase BSR scanning based on parameters stored in the memory 204.

At block 512, existing procedures for BSR scanning are performed. If the bsr_phase_count is equal to zero then the BSR system is disabled and existing BSR scanning procedures are utilized.

Thus, the method 500 operates to provide for service reselection for a device in idle mode. It should be noted that the method 500 is just one implementation and that the operations of the method 500 may be rearranged or otherwise modified such that other implementations are possible.

Origination

To address the problems of BSR associated with call origination, the BSR module 200 performs procedures allowing the device 102 to perform BSR scans prior to call origination. In one implementation, before sending an origination message the unit performs BSR scanning for More Preferred systems as defined by its preferred roaming list when not on the Most Preferred system.

The unit's decision about performing a BSR scan will be contingent upon the service option of the call and whether it is a call origination or a page response, implying that only for those specific service options and when it is a call origination message will the unit shall search for More/Most Preferred systems.

The service options and modes that govern the BSR scans to be performed before a call origination is a configurable item stored in the memory 204. The need for BSR scans to be performed during accessing the system will occur in the following scenarios as summarized in the Table below.

| Mode | Type of Traffic | Perform BSR? |
|---|---|---|
| Unit is on a less preferred 1xRTT system but 1xEVDO system is most preferred | 1xRTT (voice or data) origination | Yes |
| Unit is on a less preferred 1xEVDO system but 1xRTT system is most preferred | 1xEVDO Traffic origination | |
| Unit is on a less preferred 1xRTT as well as on a less preferred 1xEVDO system | 1xRTT or 1xEVDO origination | |

-continued

| Mode | Type of Traffic | Perform BSR? |
|---|---|---|
| Unit is not operating in hybrid mode (i.e., 1xRTT only unit) and it is on a less preferred 1xRTT system | 1xRTT origination | |

If the device 102 is not on the Most Preferred system and the service option used for the originated call and the mode from the above table match parameters stored in memory 204, the BSR module 200 performs the BSR scan before every call origination. This applies to registration message as well.

It is to be noted that although registration messages sent by the device 102 are rather infrequent, nevertheless they increase the chances of BSR module 200 to get the device back on to a More Preferred system when performing BSR upon these registrations.

In the event of a successful BSR search that results in transition of the device 102 to the More/Most Preferred system, the device shall acquire the More/Most Preferred system and then set up the traffic call on that system.

In the event of a BSR search that does not result in finding any energy on a More/Most Preferred system, the device 102 shall continue to originate on the Less Preferred system and establish the call.

Each time the device searches for More Preferred systems before call establishment there could be an additional delay. Therefore in order to avoid any noticeable impact to the user experience, the BSR module 200 can configure the BSR scan to be performed only once and that each BSR scan be limited in duration based on a configurable timer $T_{(BSR\ Access\ Search\ Complete)}$.

Figure 6:
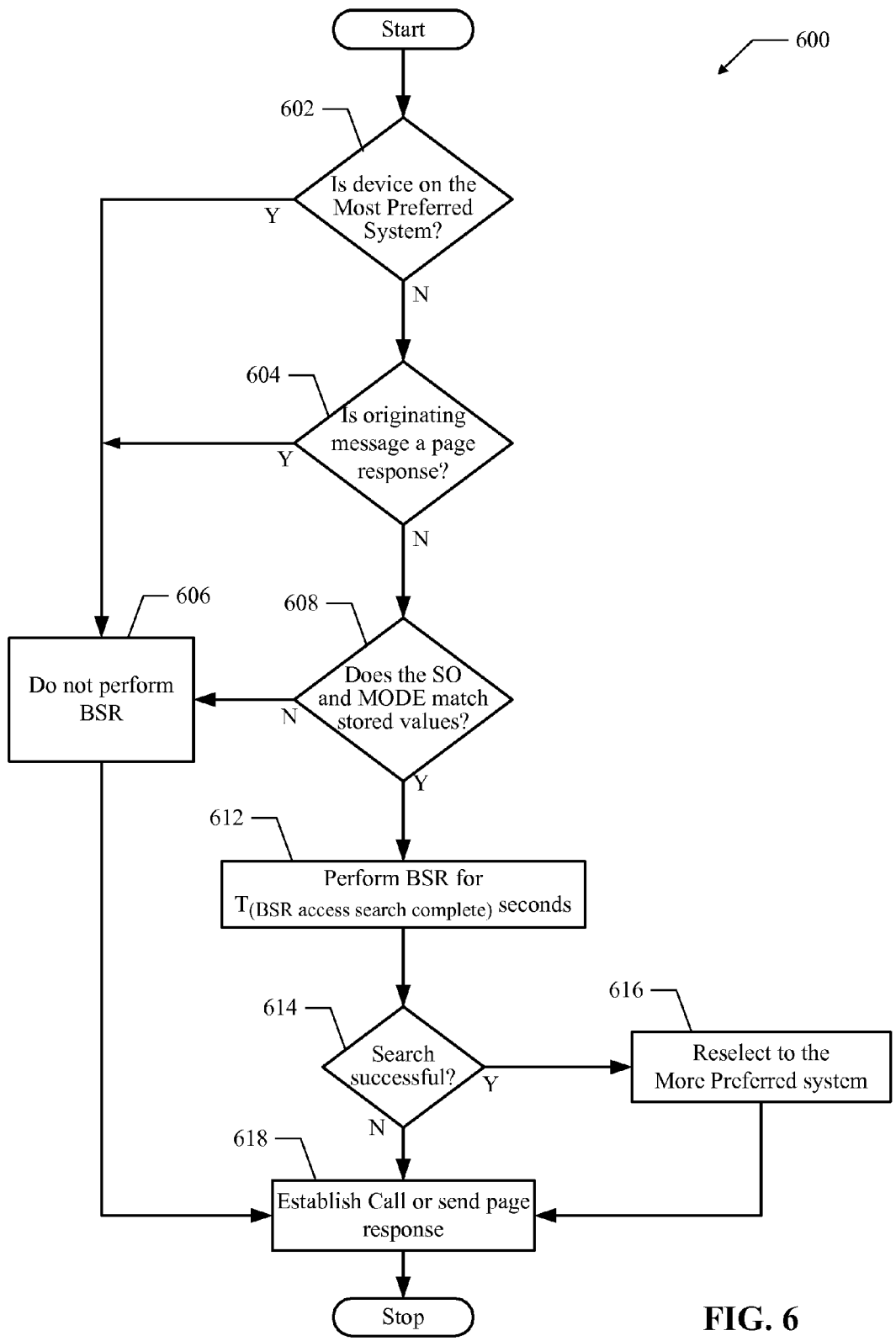
FIG. 6 shows an exemplary method for service reselection prior to call origination.

FIG. 6 shows a method 600 for performing service reselection prior to call origination. For clarity, the method 600 is described below with reference to the BSR module 200. In one implementation, the processor 202 executes one or more sets of codes to control the BSR module 200 to perform the functions described below.

At block 602, a determination is made as to whether the device is on the Most Preferred system. For example, the processor 202 maintains an identifier of the current system and compares this identifier to the prioritized roaming list stored in the memory 204 to determine whether the device in on the Most Preferred system. If the device is on the Most Preferred system the method proceeds to block 606. If the device is not on the Most Preferred system, the method proceeds to block 604.

At block 604, a determination is made as to whether the originating message is a page response message. For example, in one implementation, the processor 202 makes this determination according to the following. For a 1xEVDO system, the RequestReason field of the ConnectionRequest message specifies whether the originating activity is based on an AT (access terminal) initiated message or AN (access network) initiated message. The processor 202 uses the RequestReason field to determine the case of AT initiated [RequestReason field is (0x0)] from that of AN initiated. A BSR is only performed if the RequestReason field is set to 0x0 indicating the originating activity is AT initiated. If the originating message is a page response message, the method proceeds to block 606. If the originating message is not a page response message, it is assumed that the originating message is a call origination and the method proceeds to block 608.

At block 606, no BSR scan is performed since the device is already on the Most Preferred system or the originating message is a page response message. The method then proceeds to block 618.

At block 608, a determination is made as to whether the service option and the mode match values stored values. For example, the processor 202 compares the service option and mode to values stored in the memory 204. If the service option and mode do not match the stored values, the method proceeds to block 606. If the service option and mode match the stored values, the method proceeds to block 612.

At block 612, a BSR scan in accordance with the present invention is performed for $T_{(BSR\ access\ search\ complete)}$ seconds. For example, the processor 202 controls the transceiver 208 to perform a BSR scan in accordance with the scan procedures above.

At block 614, a determination is made as to whether the search for a More Preferred system was successful. For example, the processor 202 receives the BSR scan results from the transceiver 208 and determines if the search was successful and a More Preferred network is available. If the search was not successful, the method proceeds to block 618. If the search was successful, the method proceeds to block 616.

At block 616, a reselection to the More Preferred system discovered during the BSR scan is performed. For example, the processor 202 controls the transceiver 208 to perform reselection to the More Preferred system that was discovered.

At block 618, the call is initiated or a page response is performed on the current system or if a transition to a More Preferred system was performed, the call is initiated on the newly acquired More Preferred system. For example, the processor 202 controls the transceiver 208 to perform these functions.

Thus, the method 600 operates to provide for service reselection prior to call origination. It should be noted that the method 600 is just one implementation and that the operations of the method 600 may be rearranged or otherwise modified such that other implementations are possible.

Traffic State

To address the problems of service reselection when the device is in an active traffic state, the BSR module 108 periodically performs Better Service Reselection scanning for More Preferred systems as defined by its preferred roaming list when not on the Most Preferred system while in an active traffic call.

The BSR module 200 performs periodic scans for Better Service Reselection dependent upon the service option of the call implying that only for those specific service options shall a search for More Preferred systems be performed. The service options that govern the BSR scans will be a configurable item stored in the memory 204.

In addition two timers are used to control when and for how long BSR scanning is performed. The two timers are defined as follows.

1) $T_{Traffic\ BSR\ Frequency}$ is a time value that controls how often BSR scanning occurs.
2) $T_{BSR\ Search\ Complete}$ is a time value that controls how long BSR scans will be performed.

Figure 7:
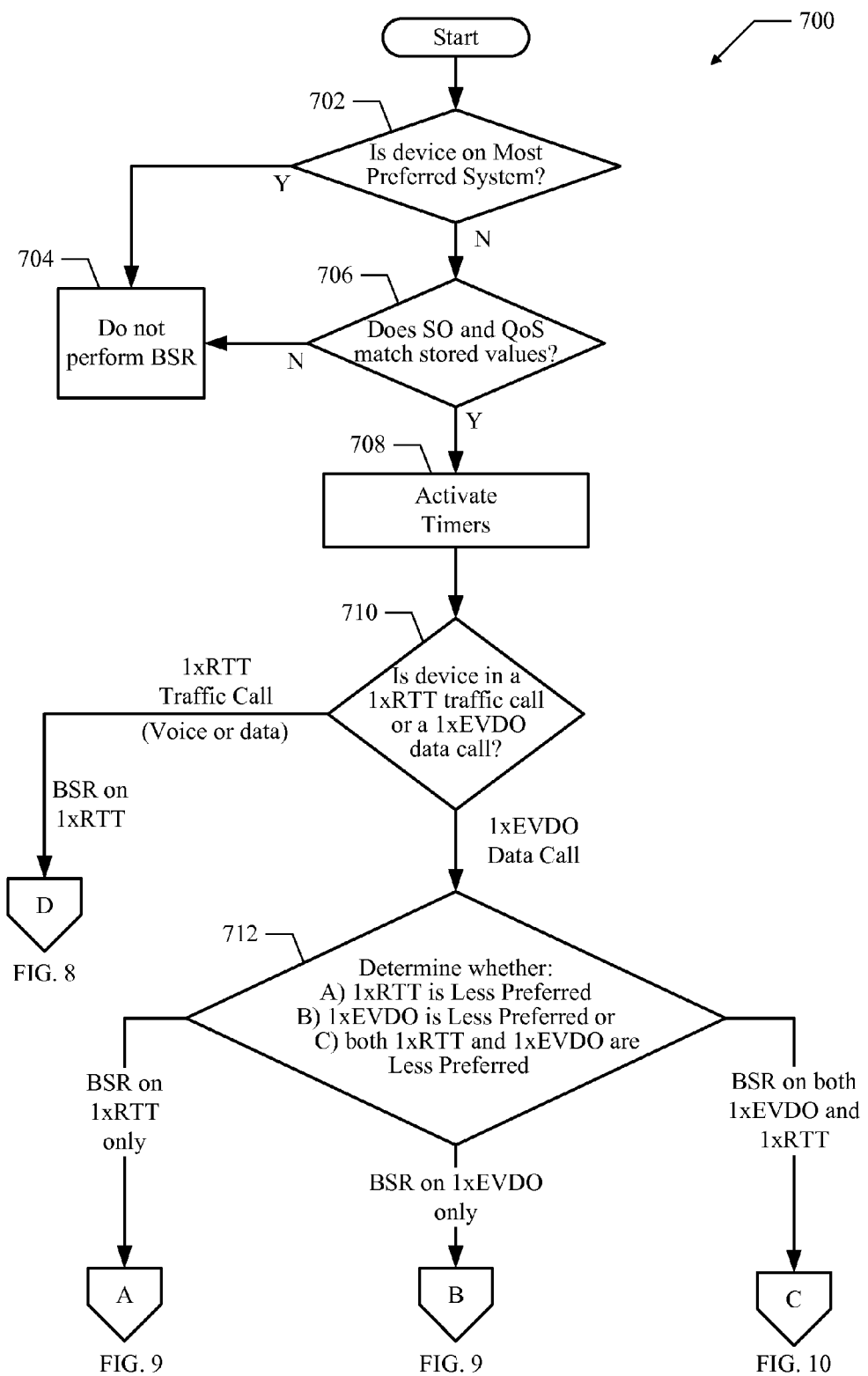
FIG. 7 shows an exemplary method for service reselection during an active traffic state.

FIG. 7 shows an exemplary method 700 for performing service reselection during an active traffic state. For clarity, the method 700 is described below with reference to the BSR module 200. In one implementation, the processor 202 executes one or more sets of codes to control the BSR module 200 to perform the functions described below.

At block 702, once a call is established a determination is made as to whether the call has been established on the Most Preferred system. For example, the processor 202 identifies the system the call has been established on and matches it to the prioritized list of systems in the memory 204 to determine if the call has been established on the Most Preferred system. If the call has been established on the Most Preferred system, the method proceeds to block 704. If the call is not on the Most Preferred system, the method proceeds to block 706.

At block 704, a BSR scan is not needed and the call continues on the current network which is the Most Preferred system.

At block 706, once a call on the less preferred system is established a determination is made as to whether both the following two conditions exist.
1) The service option used for the call matches stored values
2) QoS requirements of the traffic type match stored values For example, the processor 202 determines if the service option and QoS requirements for the call match values stored in the memory 204. If the service option currently in use and the QOS requirements for the traffic type match with stored values, the method proceeds to block 708. If either the service option or QoS requirements fail to match stored values, the method proceeds to block 704.

At block 708, the timers are activated. For example, the processor 202 activates the timers 206. The timer $T_{Traffic\ BSR\ Frequency}$ governs how frequently the unit performs the BSR scan. The frequency of such searches shall be periodic so that the time between the start of any two consecutive searches will be the same unless there is a case where the BSR scan had to be postponed due to an impending 1x paging slot not having enough time for BSR search to be completed.

Additionally upon the expiration of the timer $T_{Traffic\ BSR\ Frequency}$ the device shall scan for other systems having more preference over the system the device is currently on. The timer $T_{Traffic\ BSR\ Frequency}$ shall be reset to the specified value each time a BSR search is started.

At block 710, a determination is made as to whether the active traffic call is a 1xRTT traffic call or a 1xEVDO data call. The processor 202 makes this determination. If the call is a 1xRTT traffic call, the method proceeds to FIG. 8 at off-page indicator D. If the call is a 1xEVDO data call, the method proceeds to block 712.

At block 712, at determination is made as to which of the following three scenarios, as shown in the Table below, exists while the unit is in a 1xEVDO data call. The processor 202 makes this determination.

| | System Preferences | Decision how to perform BSR |
|---|---|---|
| A | 1xRTT system is Less Preferred and 1xEVDO system is Most Preferred | Perform BSR only for 1xRTT system |
| B | 1xRTT system is Most Preferred and 1xEVDO system is Less Preferred | Perform BSR only for 1xEVDO system |
| C | 1xRTT system is Less Preferred and 1xEVDO system is Less Preferred | Perform BSR alternately for both 1xRTT and 1xEVDO systems |

As indicated in the above Table, when operating in hybrid mode (1xRTT+1xEVDO) and if the data call is established on a 1xEVDO system that is a Less Preferred 1xEVDO system and the associated 1xRTT system is also Less Preferred, then periodic scans are performed in an alternate fashion or any other pre-defined implementation on both 1xRTT and 1xEVDO systems. The BSR scans are performed in such a manner that the time $T_{Traffic\ BSR\ Frequency}$ does not coincide or conflict with tune away instances to the 1xRTT system to monitor the GPM.

Figure 9:
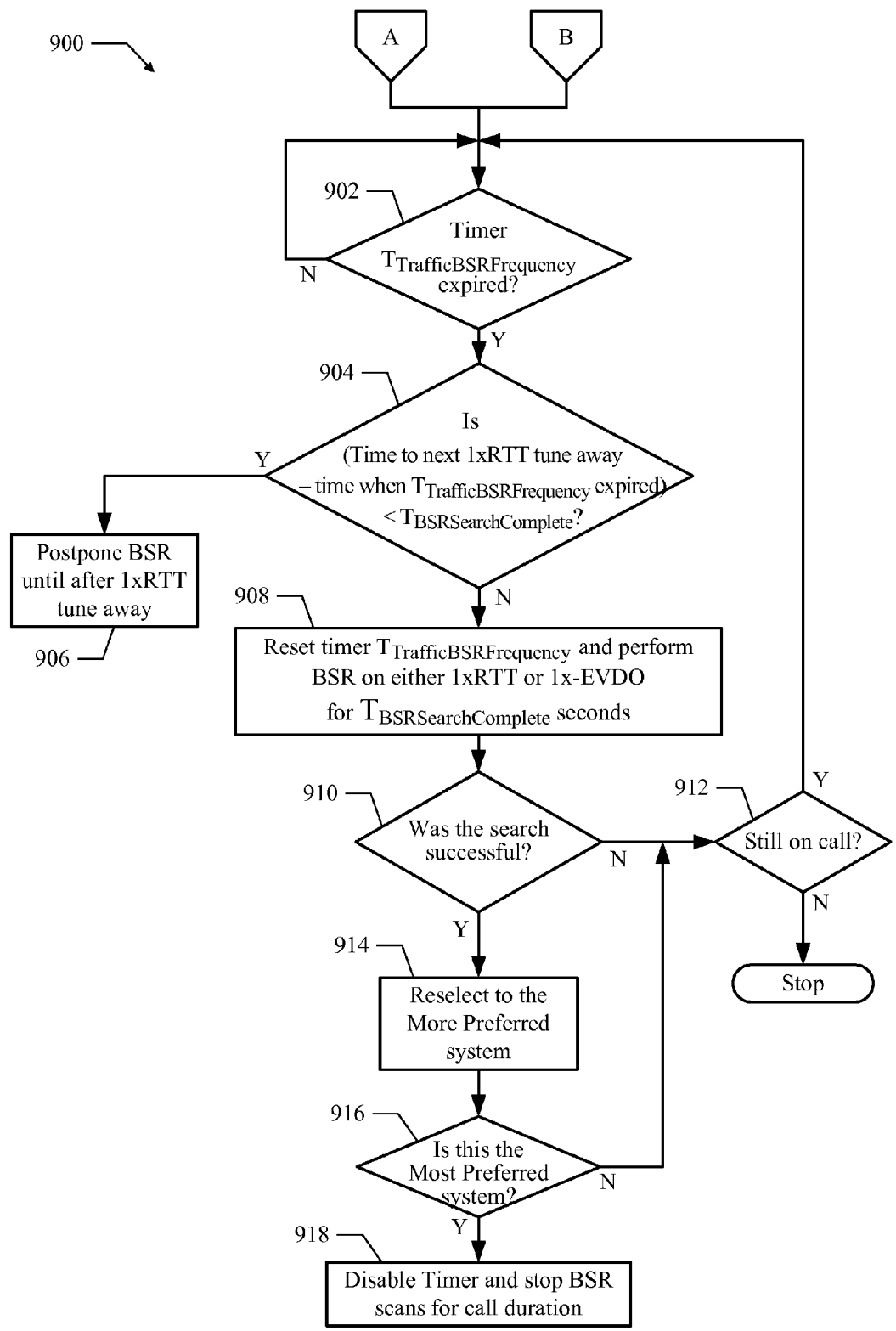
FIG. 9 shows an exemplary method for performing service reselection on one of a 1xRTT system or a 1xEVDO system during an active data call on the 1xEVDO system.

Based on the determination at block 712, the method proceeds to FIG. 9 at off-page indicator A if it is determined that a BSR scan for the Less Preferred 1xRTT system is needed. The method proceeds to FIG. 9 at off-page indicator B if it is determined that a BSR scan for the Less Preferred 1xEVDO system is needed. Otherwise, the method proceeds to FIG. 10 at off-page indicator C when BSR scans for both the 1xRTT and 1xEVDO systems are needed.

Thus, the method 700 operates to provide for service reselection during an active traffic state. It should be noted that the method 700 is just one implementation and that the operations of the method 700 may be rearranged or otherwise modified such that other implementations are possible.

Figure 8:
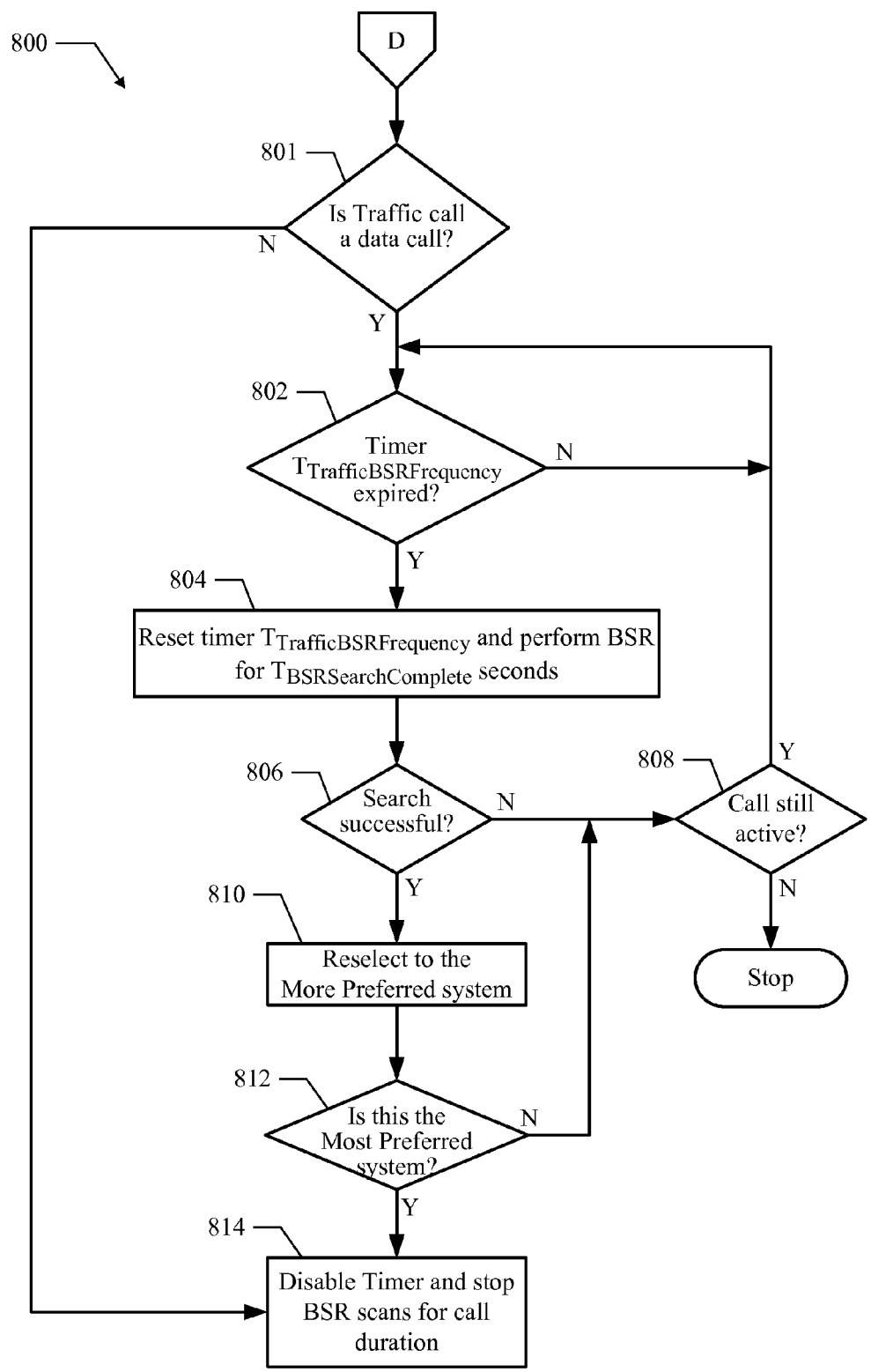
FIG. 8 shows an exemplary method for service reselection during an active traffic call on a 1xRTT system.

FIG. 8 shows a method 800 for service reselection during an active traffic call on a 1xRTT system. For example, the method 800 is entered at on-page indicator D from FIG. 7. Prior to entry into the method 800, it has been determined in the method 700 that the active call is a 1xRTT traffic call.

At block 801, a determination is made as to whether the 1xRTT traffic call is a data call. For example, the processor 202 makes this determination. If the 1xRTT traffic call is a data call, the method proceeds to block 802. If the 1xRTT traffic call is not a data call (i.e., a voice call), the method proceeds to block 814.

At block 802, a determination is made as to whether the timer $T_{Traffic\ BSR\ Frequency}$ has expired. For example, the processor 202 receives a timer expiration signal from the timer 206 to make this determination. If this timer has not expired the method remains at block 802 to wait for expiration. If this timer has expired, the method proceeds to block 804.

At block 804, the timer $T_{Traffic\ BSR\ Frequency}$ is reset and a BSR scan is perform for $T_{BSR\ Search\ Complete}$ seconds. For example, the processor 202 sends a reset signal to the timer 206. A successful BSR scan is defined to mean that the BSR module has found strong energy on a More Preferred system and is able to demodulate the overhead channels to allow communication on that system.

The time it takes to scan one channel is dependent upon the speed of the searcher and the type of scan being performed. Thus, the time to scan the entire scan list will be dependent upon the time it takes to search for More Preferred systems and will be a function of the total count of system records as well as the number of channels within each acquisition record. Hence, depending upon the Less Preferred system the device is currently on and the coverage area the device is in, the time to find a More Preferred system in each BSR search will vary.

At block 806, a determination is made as to whether the BSR scan was successful. For example, the processor 202 receives scan results from the transceiver 208 to determine if a More Preferred system has been found. If the scan was not successful, the method proceeds to block 808. If the scan was successful, the method proceeds to block 810.

At block 808, a determination is made as to whether the call is still active. For example, the processor 202 makes this determination. If the call is still active, the method proceeds to block 802. If the call is not active, the method ends.

At block 810, reselection to a More Preferred system is performed. For example, the processor 202 controls the transceiver 208 to reselect to a More Preferred system discovered during the search at block 804.

At block 812 a determination is made as to whether the currently acquired system is the Most Preferred system. For example, the processor 202 accesses the prioritized list in the memory 204 to determine if the currently acquired system is identified as the Most Preferred system in the prioritized list. If the current system is not the Most Preferred system, the method proceeds to block 808. For example, if the search resulted in the transition of the device to a More Preferred system (rather than the Most Preferred system) the timer $T_{Traffic\ BSR\ Frequency}$ shall NOT be disabled and the unit will continue to perform periodic searches until the device transitions to the Most Preferred system or the call ends. The timer $T_{BSR\ Search\ Complete}$ will govern the time spent by the unit while performing each BSR when searching for More Preferred systems.

In the event of a transition to the Most Preferred system, the method proceeds to block 814 where the processor 202 disables the timer $T_{Traffic\ BSR\ Frequency}$ and the BSR module 200 no longer perform periodic BSR searches for the remaining life of the call.

Thus, the method 800 operates to provide for service reselection during an active data call on a 1xRTT system. It should be noted that the method 800 is just one implementation and that the operations of the method 800 may be rearranged or otherwise modified such that other implementations are possible.

FIG. 9 shows an exemplary method 900 for performing service reselection on one of a 1xRTT system or a 1xEVDO system during an active data call on the 1xEVDO system. For example, the method 900 is entered at on-page indicators A or B from FIG. 7. Prior to entry into the method 900, it has been determined in the method 700 that the active call is a 1xEVDO data call.

At block 902, a determination is made as to whether the timer $T_{Traffic\ BSR\ Frequency}$ has expired. For example, the processor 202 receives a timer expiration signal from the timers 206 if the timer has expired. If this timer has not expired the method remains at block 902 to wait for expiration. If this timer has expired, the method proceeds to block 904.

At block 904, a determination is made as to whether there is enough time to perform a BSR scan without interfering with paging channel monitoring. For example, the processor 202 makes this determination according to the following expression. If the following expression is true then there is not enough time to perform the BSR scan before the next scheduled page monitoring time.

(time to next 1xRTT tune away−time when $T_{Traffic\ BSR\ Frequency}$ expired)<$T_{BSR\ Search\ Complete}$.

For example, in the case of an impending 1x paging slot to read the paging channel, the paging channel shall be read first before deciding whether or not to perform a BSR scan. Thus, if the time difference between the time to next 1xRTT tune away and the time when $T_{Traffic\ BSR\ Frequency}$ expired is less than that of $T_{BSR\ Search\ Complete}$, then the BSR scan shall be postponed to a time after the 1xRTT tune away occurs. This will prevent any missed pages that could arise as a result of performing a BSR scan and missing the impending 1x tune away slot. In the case where the unit is operating in 1xEVDO-only mode, the time until the next 1xRTT tune away is infinite so that the expression in the previous paragraph is never true, and as a result the BSR scan is not postponed.

Therefore, if the expression is true, then the method proceeds to block 906 where the BSR scan is postponed. Otherwise, the method proceeds to block 908 to setup the timers for additional BSR scanning.

At block 908, the timer $T_{Traffic\ BSR\ Frequency}$ is reset and a BSR scan for either the 1xRTT system or the 1xEVDO system is performed for $T_{BSR\ Search\ Complete}$ seconds. The system to be scanned is determined by how the method 900 is entered. For example, if the method 900 is entered via entry point A, then the 1xRTT system is scanned. If the method 900 is entered from entry point B, then the 1xEVDO system is scanned. The processor 202 resets the timers 206 and controls the transceiver 208 to begin the BSR scan. A successful BSR scan is defined to mean that the BSR module has found strong energy on a more preferred system and is able to demodulate the overhead channels to allow communication on that system.

At block 910, a determination is made as to whether the BSR scan was successful. The processor 202 receives scan results from the transceiver 208 and determines if a More Preferred system is available. If the scan was not successful, the method proceeds to block 912. If the scan was successful, the method proceeds to block 914.

At block 912, a determination is made as to whether the call is still active. For example, the processor 202 makes this determination. If the call is still active, the method proceeds to block 702. If the call is not active, the method ends.

At block 914, reselection to a More Preferred system is performed. For example, the processor 202 controls the transceiver 208 to reselect to a More Preferred system discovered during the search at block 908.

At block 916 a determination is made as to whether the currently acquired system is the Most Preferred system. For example, the processor 202 accesses the prioritized list in the memory 204 to determine if the currently acquired system is identified as the Most Preferred system in the prioritized list. If the current system is not the Most Preferred system, the method proceeds to block 912. For example, if the search resulted in the transition of the device to a More Preferred system rather than the Most Preferred system, the timer $T_{Traffic\ BSR\ Frequency}$ shall NOT be disabled and the unit will continue to perform periodic searches until it transitions to the Most Preferred system or the call ends. The timer $T_{BSR\ Search\ Complete}$ will govern the time spent by the BSR module 200 while performing each BSR when searching for More Preferred systems.

In the event of a transition to the Most Preferred system, the method proceeds to block 918 where the timer $T_{Traffic\ BSR\ Frequency}$ is disabled and the unit will no longer perform periodic BSR searches for the remaining life of the call.

Thus, the method 900 operates to provide service reselection on one of a 1xRTT system or a 1xEVDO system during an active data call on the 1xEVDO system. It should be noted that the method 900 is just one implementation and that the operations of the method 900 may be rearranged or otherwise modified such that other implementations are possible.

Figure 10:
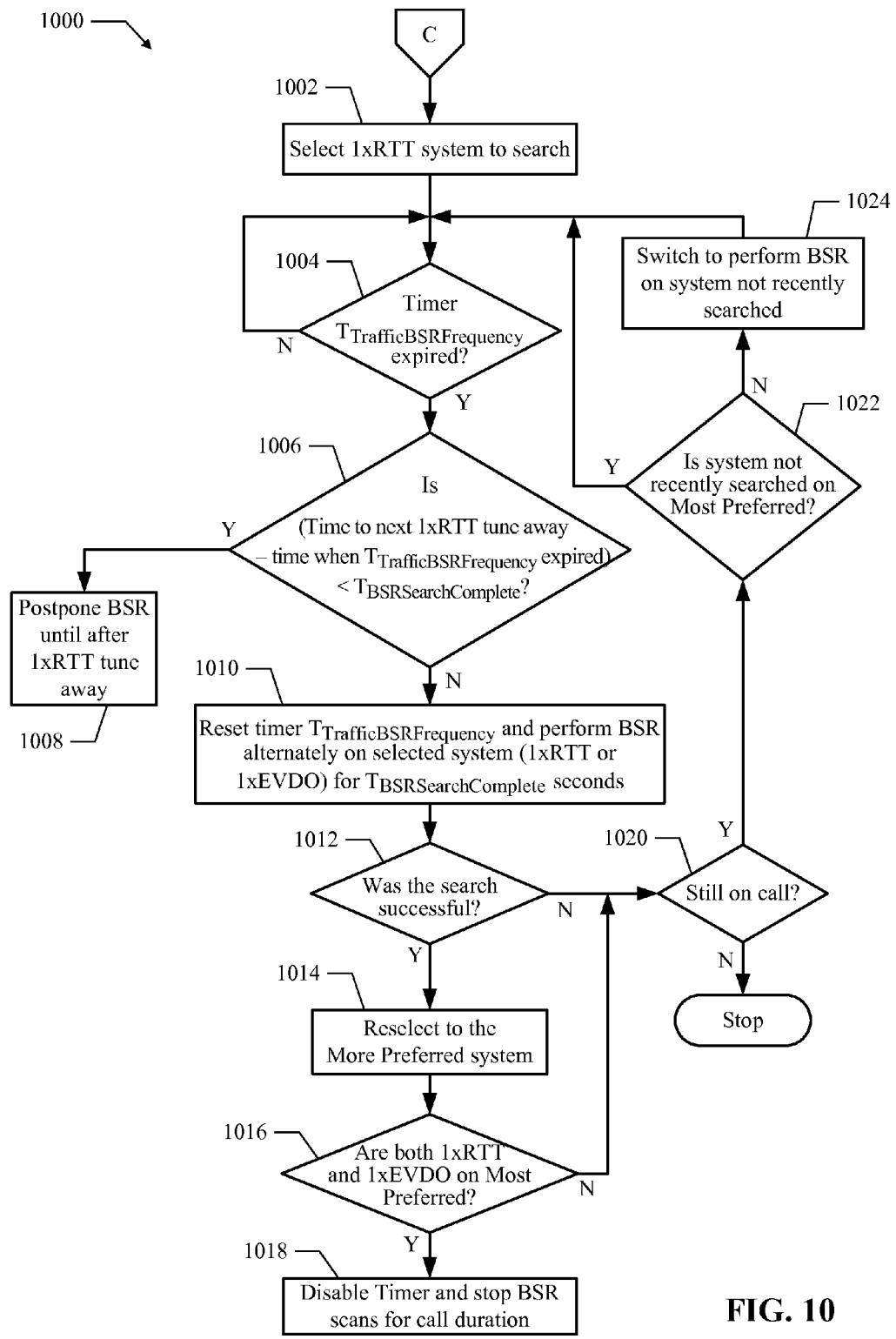
FIG. 10 shows an exemplary method for alternately performing service reselection on 1xRTT and 1xEVDO systems during an active data call on the 1xEVDO system.

FIG. 10 shows an exemplary method 1000 for alternately performing service reselection on 1xRTT and 1xEVDO systems during an active data call on the 1xEVDO system. For example, the method 1000 is entered at on-page indicator C from FIG. 7. Prior to entry into the method 1000, it has been determined in the method 700 that both the 1xRTT and 1xEVDO systems are Less Preferred systems.

At block 1002, the 1xRTT system is selected for BSR searching. The processor 202 makes this initial selection. For example, the method 1000 alternately searches the 1xRTT and 1xEVDO systems. Thus, the processor 202 selects the 1xRTT system to begin searching. The method 1000 will then switch to search the 1xEVDO system and continue this alternating search process in an attempt to find the Most Preferred 1xRTT and 1xEVDO systems. Should the Most Preferred system be found for either of the 1xRTT or the 1xEVDO systems, the method 1000 continues searching only the system that is still operating on other than the Most Preferred system.

At block 1004, a determination is made as to whether the timer $T_{Traffic\ BSR\ Frequency}$ has expired. For example, if the timer has expired, the timer 206 sends and expiration signal to the processor 202. If this timer has not expired the method remains at block 1004 to wait for expiration. If this timer has expired, the method proceeds to block 1006.

At block 1006, a determination is made as to whether there is enough time to perform a BSR scan without interfering with page channel monitoring. For example, the processor 202 evaluates the follow expression to make this determination. If the following expression is true then there is not enough time to perform the BSR scan before the next scheduled page monitoring time.

(time to next 1xRTT tune away–time when $T_{Traffic\ BSR\ Frequency}$ expired)<$T_{BSR\ Search\ Complete}$.

For example, in the case of an impending 1x paging slot to read the paging channel, the device shall first read the paging channel before deciding whether or not to perform a BSR scan. Thus, if the time difference between the time to next 1xRTT tune away and time when $T_{Traffic\ BSR\ Frequency}$ expired is less than that of $T_{BSR\ Search\ Complete}$ then the BSR scan shall be postponed to a time after the 1xRTT tune away occurs. This will prevent any missed pages that could arise as a result of performing a BSR scan and missing the impending 1x tune away slot.

Therefore, if the expression is true, then the method proceeds to block 1008 where the BSR scan is postponed. Otherwise, the method proceeds to block 1010 to setup the timers for additional BSR scanning.

At block 1010, the timer $T_{Traffic\ BSR\ Frequency}$ is reset and a BSR scan for one of the 1xRTT or 1xEVDO system is perform for $T_{BSR\ Search\ Complete}$ seconds. For example, the method 1000 alternates between the 1xRTT and 1xEVDO systems when performing BSR. The processor 202 sets the timers 206 and controls the transceiver 208 to perform the BSR scan on the appropriate system. For example, the 1xRTT system is initially selected to be scanned but the 1xEVDO system is alternately scan during subsequence operations of the method 1000. A successful BSR scan is defined to mean that the transceiver 208 has found strong energy on a More Preferred system and is able to demodulate the overhead channels to allow communication on that system.

At block 1012, a determination is made as to whether the BSR scan was successful. The processor 202 makes this determination by evaluating the results of the scan from the transceiver 208. If the scan was not successful, the method proceeds to block 1020. If the scan was successful, the method proceeds to block 1014.

At block 1020, a determination is made as to whether the call is still active. The processor 202 makes this determination. If the call is still active, the method proceeds to block 1022. If the call is not active, the method ends.

At block 1014, reselection to a More Preferred system is performed. For example, the processor 202 controls the transceiver 208 to reselect to a More Preferred system discovered during the search at block 1010.

At block 1016 a determination is made as to whether both the currently acquired 1xRTT and 1xEVDO systems are the Most Preferred systems. For example, the processor 202 accesses the prioritized list in the memory 204 to determine if both the currently acquired systems are identified as the Most Preferred systems in the prioritized list. If either of the current systems is not the Most Preferred system, the method proceeds to block 1020. For example, if the search resulted in the transition of the device to a More Preferred system rather than the Most Preferred system, the timer $T_{Traffic\ BSR\ Frequency}$ shall NOT be disabled and the unit will continue to perform periodic searches until it transitions to the Most Preferred system or the call ends. The timer $T_{BSR\ Search\ Complete}$ will govern the time spent by the BSR module 200 while performing each BSR when searching for More Preferred systems.

In the event of a transition to the Most Preferred system for both the 1xRTT and 1xEVDO systems, the method proceeds to block 1018 where the timer $T_{Traffic\ BSR\ Frequency}$ is disabled and the unit will no longer perform periodic BSR searches for the remaining life of the call.

At block 1022, a determination is made as to whether the system that was not searched in the most recent BSR scan is on the Most Preferred system. For example, if the 1xRTT system was searched in the most recent BSR scan, then the determination is whether the 1xEVDO system is on the Most Preferred system. If the 1xEVDO system was searched in the most recent BSR scan, then the determination is whether the 1xRTT system is on the Most Preferred. For example, the processor 202 accesses the prioritized list in the memory 204 to determine if the system not searched in the most recent BSR scan is identified as the Most Preferred system in the prioritized list.

If it is determined that the system not searched in the most recent BSR scan is not on the Most Preferred system, then the method proceeds to block 1024, to switch to that system so that searching of that system will occur. If it is determined that the system not searched in the most recent BSR scan is on the Most Preferred system, then the method proceeds to block 1004 to search the most recently searched system again.

At block 1024, a switch is performed so that BSR searching will be performed on the system that was not searched in the most recent BSR scan. For example, the processor 202 controls the transceiver 208 to search the appropriate system.

Thus, the method 1000 operates to provide for service reselection during an active data call when both the 1xRTT and 1xEVDO systems are Less Preferred. It should be noted that the method 1000 is just one implementation and that the operations of the method 1000 may be rearranged or otherwise modified such that other implementations are possible.

In one implementation, when performing BSR, to prevent the access network from sending data during the BSR event, the DRC cover shall be set to null before the event and device's reverse link power amplifier stopped. Upon successfully completing the BSR and finding a More Preferred 1xRTT system, the device shall send a connection close message.

The time required to complete the scan ($T_{BSR\ Search\ complete}$) shall be kept such that it is less than the 1x slot cycle length (1.28*2^SCI) so that the next tune away occurrence to read the 1xRTT GPM is not interrupted.

If the search is not successful, the device shall resume the data activity on the 1xEVDO system. If the search determines a More Preferred system, the device shall perform a handoff to the More Preferred system and perform traffic channel establishment procedures.

1x Operation in Non-Hybrid Mode

For 1x traffic channel operation the device will transition from an active packet data state to a dormant packet data state where the PPP link between the device and the PDSN will be maintained, prior to the expiration of $T_{Traffic\ BSR\ Frequency}$. Once the data session goes dormant the device will then perform the BSR scan for time $T_{BSR\ Search\ Complete}$ resulting in the following scenarios.

Scenario 1 (BSR Scan Yields No More Preferred Systems)

If the scan is unsuccessful, the device resumes the activity it was doing prior to it going dormant and will send an origination message setting the DRS bit to 1 indicating that there is data on the reverse link to be transmitted at which point the base station will assign the traffic channel resources and perform traffic channel establishment procedures. The PPP session will not need to be re-established and the device will establish the traffic channel.

Scenario 2 (BSR Scan Yields a More Preferred System)

If the BSR scan results in criteria being met for finding and declaring a More Preferred system, the device will then perform a dormant handoff to the new PCF/PDSN as it will be unlikely for the old system to share the PDSN with the new system. The PPP session will need to be re-established and the device will perform a PPP re-sync and establish the traffic channel.

Figure 11:
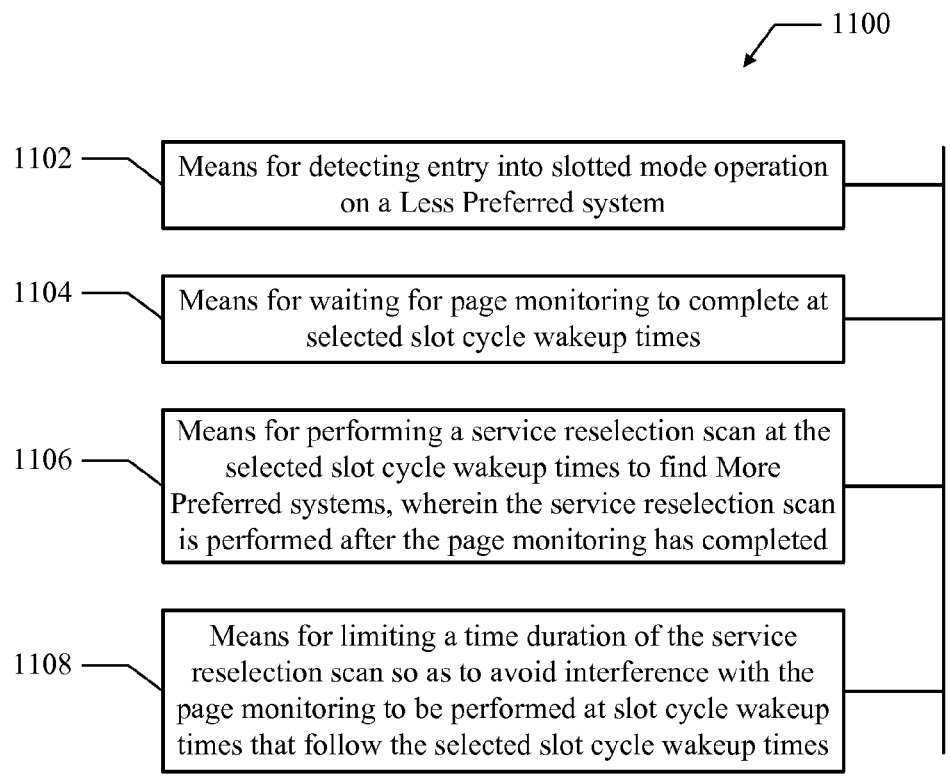
FIG. 11 shows an exemplary apparatus for performing better service reselection on a device in the idle mode.

FIG. 11 shows an exemplary service reselection apparatus 1100 for performing service reselection at a device during idle mode. For example, the apparatus 1100 is suitable for use as the reselection module 200 shown in FIG. 2. In an aspect, the apparatus 1100 comprises one or more modules configured to provide aspects of a service reselection system as described herein. For example, in one implementation, each module comprises hardware and/or hardware executing software.

The apparatus 1100 comprises means (1102) for detecting entry into slotted mode operation on a Less Preferred system, which in an aspect comprises the processor 202 and the memory 204.

The apparatus 1100 also comprises means (1104) for waiting for page monitoring to complete at selected slot cycle wakeup times, which in an aspect comprises the processor 202 and the transceiver 208.

The apparatus 1100 also comprises means (1106) for performing a service reselection scan at the selected slot cycle wakeup times to find More Preferred systems, wherein the service reselection scan is performed after the page monitoring has completed, which in an aspect comprises the processor 202 and the transceiver 208.

The apparatus 1100 also comprises means (1108) for limiting a time duration of the service reselection scan so as to avoid interference with the page monitoring to be performed at slot cycle wakeup times that follow the selected slot cycle wakeup times, which in an aspect comprises the processor 202 and the timers 206.

Figure 12:
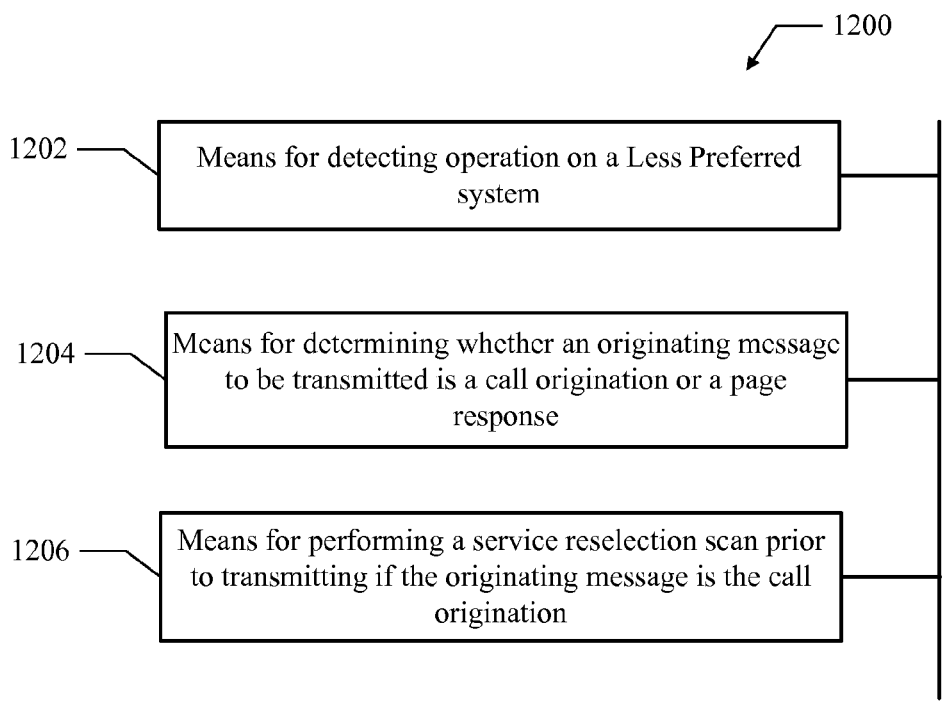
FIG. 12 shows an exemplary apparatus for performing better service reselection on a device during call origination mode.

FIG. 12 shows an exemplary service reselection apparatus 1200 for performing service reselection at a device during origination mode. For example, the apparatus 1200 is suitable for use as the reselection module 200 shown in FIG. 2. In an aspect, the apparatus 1200 comprises one or more modules configured to provide aspects of a service reselection system as described herein. For example, in one implementation, each module comprises hardware and/or hardware executing software.

The apparatus 1200 comprises means (1202) for detecting operation on a Less Preferred system, which in an aspect comprises the processor 202 and the memory 204.

The apparatus 1200 also comprises means (1204) for determining whether an originating message to be transmitted is a call origination or a page response, which in an aspect comprises the processor 202.

The apparatus 1200 also comprises means (1206) for performing a service reselection scan prior to transmitting if the originating message is the call origination, which in an aspect comprises the processor 202 and the transceiver 208.

Figure 13:
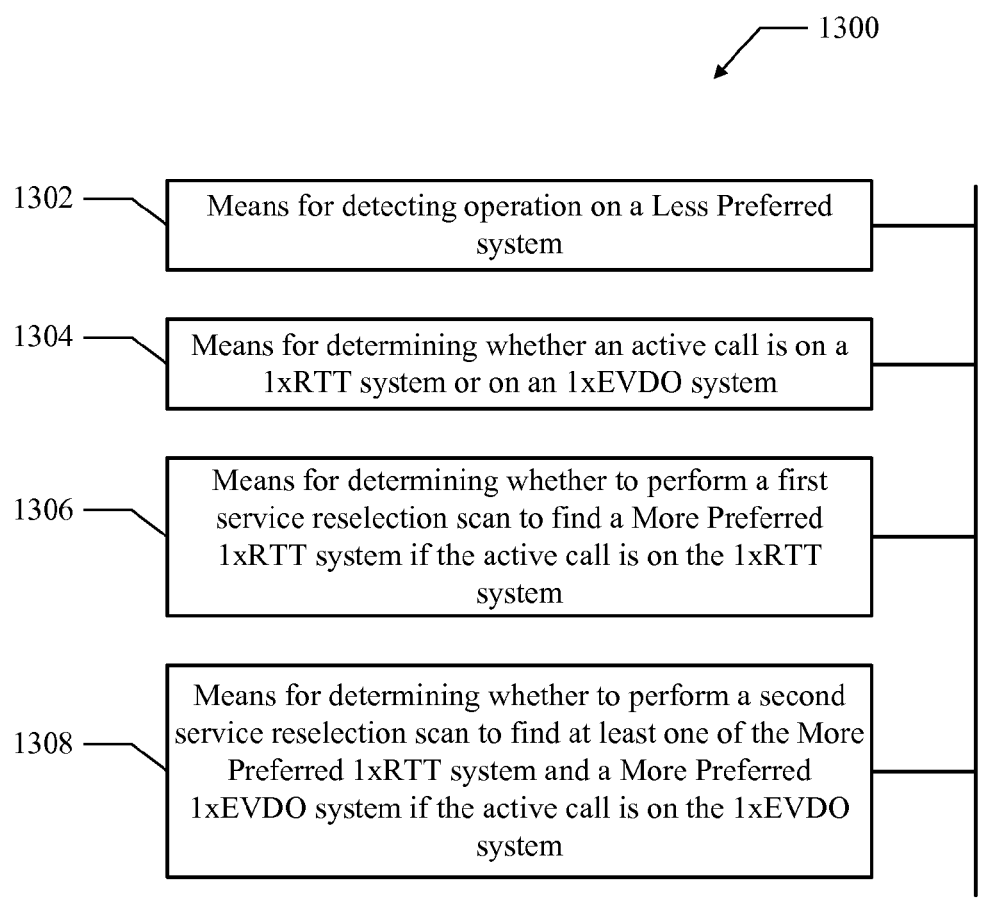
FIG. 13 shows an exemplary apparatus for performing better service reselection on a device during an active traffic mode.

FIG. 13 shows an exemplary service reselection apparatus 1300 for performing service reselection at a device during active traffic mode. For example, the apparatus 1300 is suitable for use as the reselection module 200 shown in FIG. 2. In an aspect, the apparatus 1300 comprises one or more modules configured to provide aspects of a service reselection system as described herein. For example, in one implementation, each module comprises hardware and/or hardware executing software.

The apparatus 1300 comprises means (1302) for detecting operation on a Less Preferred system, which in an aspect comprises the processor 202 and the memory 204.

The apparatus 1300 also comprises means (1304) for determining whether an active call is on a 1xRTT system or on a 1xEVDO system, which in an aspect comprises the processor 202 and the transceiver 208.

The apparatus 1300 also comprises means (1306) for determining whether to perform a first service reselection scan to find a More Preferred 1xRTT system if the active call is on the 1xRTT system, which in an aspect comprises the processor 202 and the transceiver 208

The apparatus 1300 also comprises means (1308) for determining whether to perform a second service reselection scan to find at least one of the More Preferred 1xRTT system and a More Preferred 1xEVDO system if the active call is on the 1xEVDO system, which in an aspect comprises the processor 202 and the transceiver 208.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. A method for better service reselection (BSR) in a communication network, the method comprising:
    detecting entry into slotted mode operation on a Less Preferred system;
    waiting for page monitoring to complete at selected slot cycle wakeup times;
    performing a service reselection scan at the selected slot cycle wakeup times to find More Preferred systems, wherein the service reselection scan is performed after the page monitoring has completed; and
    limiting a time duration of the service reselection scan so as to avoid interference with the page monitoring to be performed at slot cycle wakeup times that follow the selected slot cycle wakeup times,
    wherein said performing a service reselection scan comprises performing the service reselection scans in phases that are determined from a phase count parameter, and wherein said performing a service reselection scan comprises performing the service reselection scan in a default phase if the phase count parameter is one or greater than one.

2. The method of claim 1, wherein said performing comprising performing the service reselection scan in one or more intermediate phases if the phase count parameter is greater than one.

3. The method of claim 2, further comprising selecting the selected slot cycle wakeup times so that a time interval between the service reselection scans in the one or more intermediate phases is either increased or decreased.

4. The method of claim 1, wherein said performing comprises performing a mini service reselection scan comprising one of:
    scanning a first channel in a prioritized list followed by remaining channels in the prioritized list until the time duration expires; and
    scanning higher priority channels in a first portion of the time duration and lower priority channels in a second portion of the time duration.

5. An apparatus for better service reselection (BSR) in a communication network, the apparatus comprising:
    means for detecting entry into slotted mode operation on a Less Preferred system;
    means for waiting for page monitoring to complete at selected slot cycle wakeup times;
    means for performing a service reselection scan at the selected slot cycle wakeup times to find More Preferred systems, wherein the service reselection scan is performed after the page monitoring has completed; and
    means for limiting a time duration of the service reselection scan so as to avoid interference with the page monitoring to be performed at slot cycle wakeup times that follow the selected slot cycle wakeup times,
    wherein said means for performing a service reselection scan comprises means for performing the service reselection scans in phases that are determined from a phase count parameter, and wherein said means for performing a service reselection scan comprises means for performing the service reselection scan in a default phase if the phase count parameter is one or greater than one.

6. The apparatus of claim 5, further comprising means for selecting the selected slot cycle wakeup times so that a time interval between the service reselection scans in one or more intermediate phases is either increased or decreased.

7. The apparatus of claim 5, wherein said means for performing comprises:
    means for scanning a first channel in a prioritized list followed by remaining channels in the prioritized list until the time duration expires; and
    means for scanning higher priority channels in a first portion of the time duration and lower priority channels in a second portion of the time duration.

8. An apparatus for better service reselection (BSR) in a communication network, the apparatus comprising:
    a transceiver configured to communicate on the communication network; and
    a processor coupled to the transceiver and configured to:
        detect entry into slotted mode operation on a Less Preferred system;
        wait for page monitoring to complete at selected slot cycle wakeup times;

perform a service reselection scan at the selected slot cycle wakeup times to find More Preferred systems, wherein the service reselection scan is performed after the page monitoring has completed; and limit a time duration of the service reselection scan so as to avoid interference with the page monitoring to be performed at slot cycle wakeup times that follow the selected slot cycle wakeup times, wherein said processor is configured to perform the service reselection scans in phases that are determined from a phase count parameter, and wherein said processor is configured to perform said performing a service reselection scan in a default phase if the phase count parameter is one or greater than one.

9. The apparatus of claim 8, wherein said processor is configured to select the selected slot cycle wakeup times so that a time interval between service reselection scans in the one or more intermediate phases is either increased or decreased.

10. The apparatus of claim 8, wherein said processor is configured to perform one of:

scanning a first channel in a prioritized list followed by remaining channels in the prioritized list until the time duration expires; and scanning higher priority channels in a first portion of the time duration and lower priority channels in a second portion of the time duration.

11. A computer program product for better service reselection (BSR) in a communication network, the computer program product comprising:

a non-transitory computer-readable medium embodying codes executable by a processor to:

detect entry into slotted mode operation on a Less Preferred system;

wait for page monitoring to complete at selected slot cycle wakeup times;

perform a service reselection scan at the selected slot cycle wakeup times to find More Preferred systems, wherein the service reselection scan is performed after the page monitoring has completed; and limit a time duration of the service reselection scan so as to avoid interference with the page monitoring to be performed at slot cycle wakeup times that follow the selected slot cycle wakeup times, wherein said codes are configured to cause the processor to perform the service reselection scans in phases that are determined from a phase count parameter, and wherein said codes are configured to cause the processor to perform the service reselection scan in a default phase if the phase count parameter is one or greater than one.

12. The computer-readable medium of claim 11, wherein said codes are configured to cause the processor to select the selected slot cycle wakeup times so that a time interval between the service reselection scans in the one or more intermediate phases is either increased or decreased.

13. The computer-readable medium of claim 11, wherein said codes are configured to cause the processor to perform one of:

scanning a first channel in a prioritized list followed by remaining channels in the prioritized list until the time duration expires; and scanning higher priority channels in a first portion of the time duration and lower priority channels in a second portion of the time duration.

* * * * *